July 19, 1927.
A. W. BAKER
PULLEY BLOCK
Filed Jan. 15, 1927
1,636,273
2 Sheets-Sheet 1
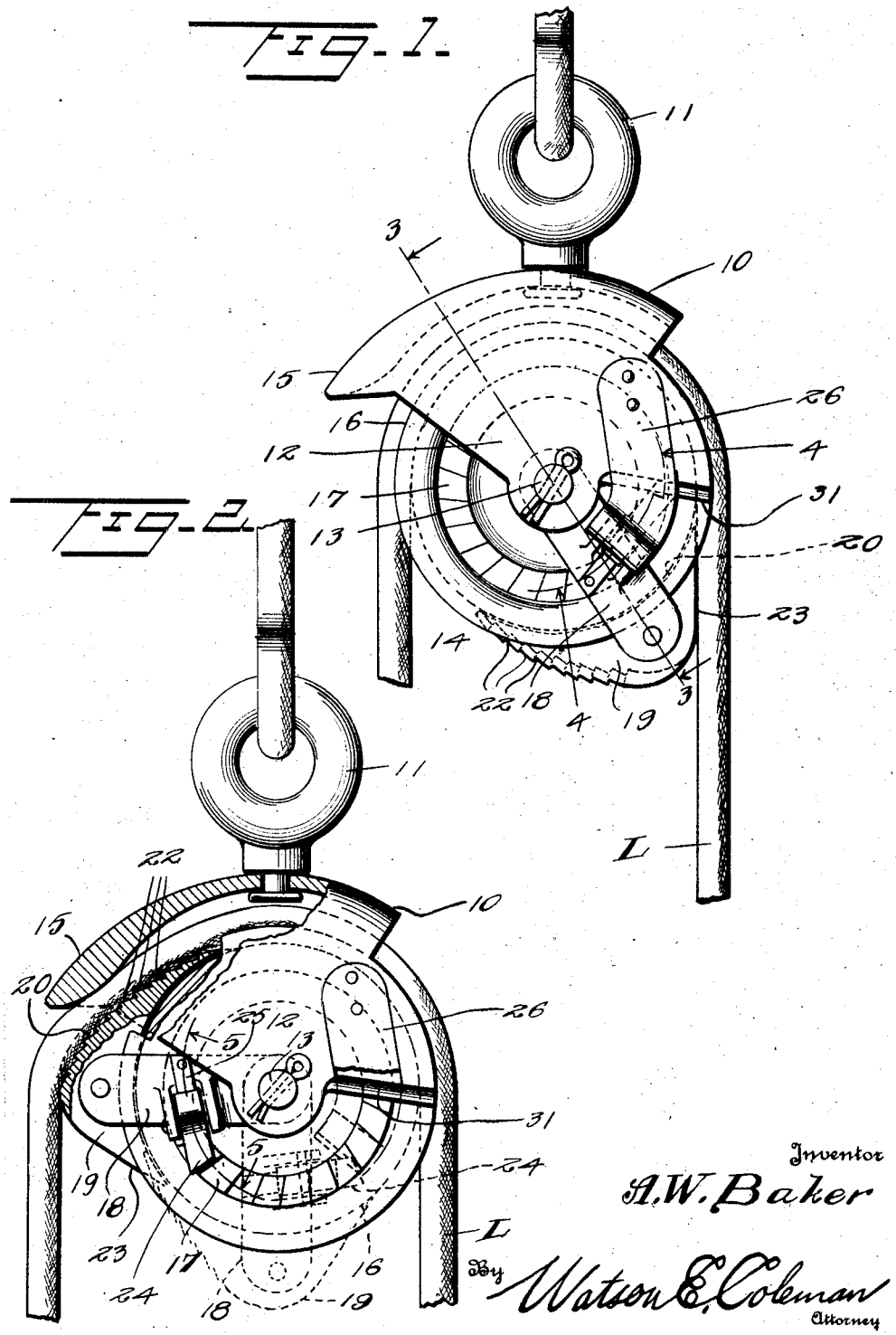
Inventor
A. W. Baker
By Watson E. Coleman
Attorney July 19, 1927.
A. W. BAKER
PULLEY BLOCK
Filed Jan. 15, 1927
1,636,273
2 Sheets-Sheet 2
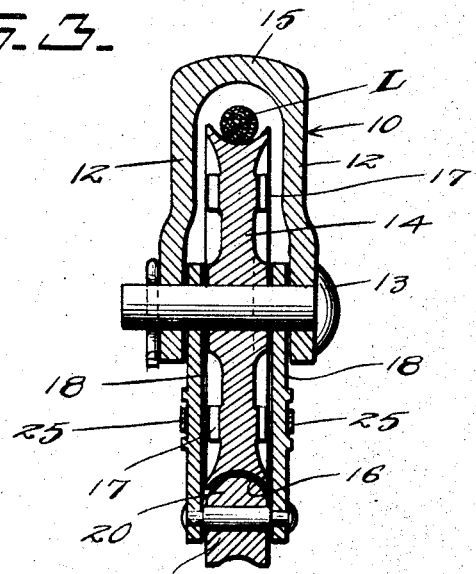
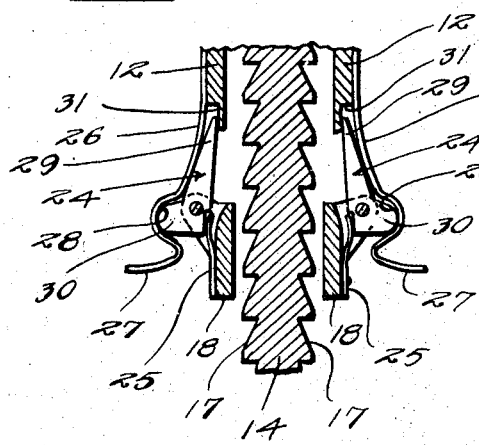
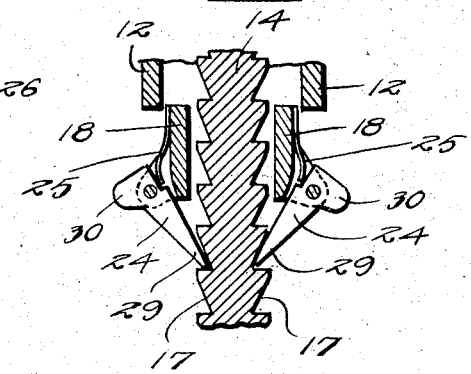
Inventor
A. W. Baker
By Watson E. Coleman
Attorney Patented July 19, 1927.

1,636,273

UNITED STATES PATENT OFFICE.

ARNOLD W. BAKER, OF COOPER HILL, MISSOURI.

PULLEY BLOCK.

Application filed January 15, 1927. Serial No. 161,426.

This invention relates to a snatch block and has for a particular object thereof the provision of a device of this character having a readily constructible and positively operating clutch brake for gripping the line of the block when the load end thereof starts to recede from the sheave.

A further object of the invention is to provide a construction such that the clutch brake may be readily locked in inoperative position, so that the block may be employed as an ordinary block.

A further object of the invention is to produce a device of this character in which the means for holding the brake in inoperative positions act to release the clutch element of the brake in event the brake has a tendency to drag and move with the sheave and thus come into a position where it might engage and interfere with the load end of the line.

These and other objects I attain by the construction shown in the accompanying drawings, wherein for the purpose of illustration is shown a preferred embodiment of my invention and wherein:—

Figure 1 is a side elevation of a snatch block constructed in accordance with my invention, the wedge block being shown as held in its inoperative position;

Figure 2 is a similar view partially broken away showing the wedge block in its locking position in solid lines and in its normal position in dotted lines;

Figure 3 is a section on the line 3—3 of Figure 1;

Figure 4 is a section on the line 4—4 of Figure 1;

Figure 5 is a section on the line 5—5 of Figure 2.

Referring now more particularly to the drawings, the numeral 10 indicates a holding block having the usual swivel supporting eye 11 and opposed side walls 12 mounting a pivot 13 upon which the sheave 14 operates. The side walls 12 are secured to one another by a connecting wall 15, which opposes the grooved periphery 16 of the sheave 14. This sheave is provided upon opposite side faces thereof with circular ratchet racks 17.

Mounted upon the pivot 13 between opposite side faces of the hub of the sheave and the opposed faces of the walls 12 and freely rotatable about the pivot are a pair of links 18, the outer ends of which pivotally engage a wedge block 19 at the approximate center thereof. The wedge block 19 has the inner or sheave rim opposing face 20 thereof shaped to fit within the groove 16 of the sheave and its outer face at one end thereof is formed with transversely extending ratchet-like teeth 22. The outer end 23 of the wedge block is smooth and preferably disposed tangentially to the bottom of the groove 21 of the sheave. Pivotally mounted upon each link 18 is a dog 24 for coaction with the ratchet 17 upon the adjacent face of the sheave, each dog being normally maintained in engagement with the teeth of its ratchet by a light spring 25 carried by the associated link. It will be obvious that upon rotation of the sheave 14 in one direction, the wedge block and links will move with the sheave until the teeth 22 of the wedge block engage the line L, forcing the same into clamping engagement with the inner face of the wall 15. Since the teeth will actually engage in the line, a further pull on the line will tend to increase the wedging action and accordingly the resistance to downward movement of the load end of the line.

In order that the block may be employed as an ordinary block, if so desired, I secure to the side walls 12 relatively strong springs 26, the ends of which overlie the face of the sheave 14 and have at their outer ends cam faces 27 and adjacent these outer ends notches 28. The outer faces of the dogs 24 at the opposite sides of the pivot thereof from the noses 29 are provided with lugs 30 which, during movement of the links 18 in one direction, engage cams 27 and are thereby rotated about their pivots, so that they disengage from the ratchets 17. Continued movement of the links 18 in this direction cause the noses 29 of the dogs to enter recesses 31 formed between the springs 26 and the walls 12 and at the same time, the lugs 24 snap into the notches 28, so that the links are held against return movement and the lugs are positively held out of engagement with the ratchets. It will, of course, be understood that a considerable degree of force must be applied to the links to cause the dogs to thus become engaged. These springs serve the additional function of providing a limit or check to motion of the wedge block toward the load supporting end of the line and thus prevent wear upon the line.

It will be obvious that a structure of this character may be relatively cheaply produced and may be very strongly and durably constructed. It will also be obvious that the construction hereinbefore set forth is capable of a certain range of change and modification without materially departing from the spirit of the invention and I accordingly do not limit myself to such specific structure except as hereinafter claimed.

I claim:—

1. In combination, a sheave having a ratchet rack upon a side face thereof, a holding block having side walls forming a mounting for the pivot of the sheave and a connecting wall for said side walls opposing the periphery of the sheave, a pair of links mounted upon said pivot, a wedge block engaging the periphery of the sheave and to which the outer ends of the links are pivotally connected, and a ratchet pawl carried by one of said links and coacting with the ratchet rack of the sheave and spring-pressed for engagement with said rack.

2. In combination, a sheave having a ratchet rack upon a side face thereof, a holding block having side walls forming a mounting for the pivot of the sheave and a connecting wall for said side walls opposing the periphery of the sheave, a pair of links mounted upon said pivot, a wedge block engaging the periphery of the sheave and to which the outer ends of the links are pivotally connected and a ratchet pawl carried by one of said links and coacting with the ratchet rack of the sheave and spring-pressed for engagement with said rack, a resilient element secured to one of said side walls and having coaction with said pawl, retaining the pawl out of engagement with the rack against the action of the spring thereof and maintaining said links and wedge block in one position with relation to the block.

3. In combination, a sheave having a ratchet rack upon a side face thereof, a holding block having side walls forming a mounting for the pivot of the sheave and a connecting wall for said side walls opposing the periphery of the sheave, a pair of links mounted upon said pivot, a wedge block engaging the periphery of the sheave and to which the outer ends of the links are pivotally connected, a ratchet pawl carried by one of said links and coacting with the ratchet rack of the sheave and spring-pressed for engagement with said rack whereby upon rotation of the sheave in one direction the wedge block moves with the pawls and forces a line engaged with the sheave into engagement with the connecting wall of the housing to thereby limit movement of the line and means carried by the housing operatively engaging the wedge block during its movement in the opposite direction to yieldably limit movement in said direction.

4. In combination, a sheave having a ratchet rack upon a side face thereof, a holding block having side walls forming a mounting for the pivot of the sheave and a connecting wall for said side walls opposing the periphery of the sheave, a pair of links mounted upon said pivot, a wedge block engaging the periphery of the sheave and to which the outer ends of the links are pivotally connected, a ratchet pawl carried by one of said links and coacting with the ratchet rack of the sheave and spring-pressed for engagement with said rack whereby upon rotation of the sheave in one direction the wedge block moves with the pawls and forces a line engaged with the sheave into engagement with the connecting wall of the housing to thereby limit movement of the line and means carried by the housing operatively engaging the wedge block during its movement in the opposite direction to yieldably limit movement in said direction, said means upon the application of pressure moving the wedge block in said direction operatively engaging and holding the wedge block against movement with relation to the block and withdrawing said pawl from engagement with the rack.

5. In combination, a sheave having a ratchet rack upon a side face thereof, a holding block having side walls forming a mounting for the pivot of the sheave and a connecting wall for said side walls opposing the periphery of the sheave, a pair of links mounted upon said pivot, a wedge block engaging the periphery of the sheave and to which the outer ends of the links are pivotally connected, and a ratchet pawl carried by one of said links and coacting with the ratchet rack of the sheave and spring-pressed for engagement with said rack, a resilient element secured to one of said side walls and having coaction with said pawl, retaining the pawl out of engagement with the rack against the action of the spring thereof and maintaining said links and wedge block in one position with relation to the block, said resilient element combining with the side wall to produce a recess for the reception of the nose of the pawl, the free end of the resilient element being formed as a cam engaging and elevating the pawl for entrance into said recess, said pawl having a portion entering a notch formed in the adjacent face of the resilient element when the nose thereof is engaged in said recess.

In testimony whereof I hereunto affix my signature.

ARNOLD W. BAKER.